United States Patent Office.

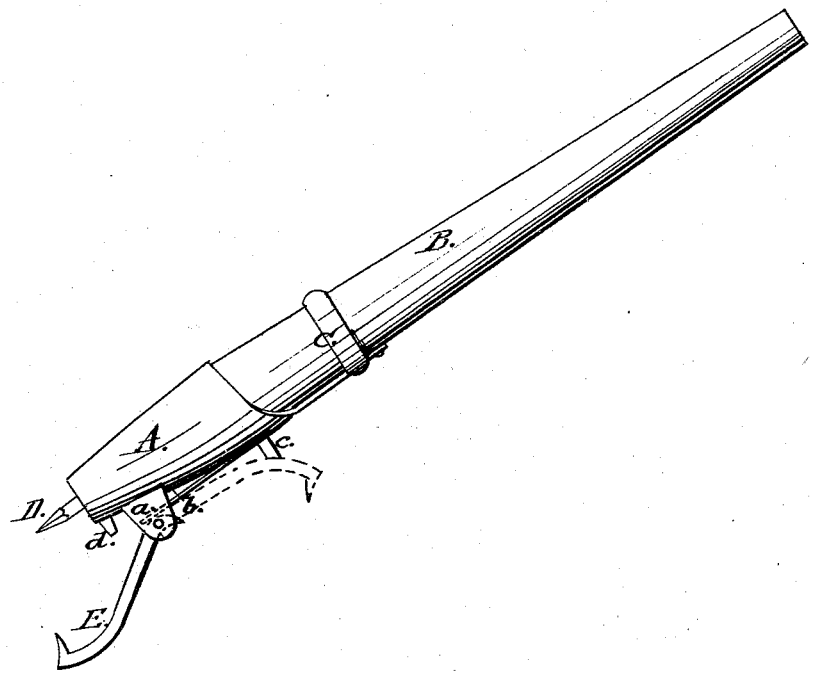

W. Q. GREELY, OF ST. ANTHONY, MINNESOTA.

Letters Patent No. 98,584, dated January 4, 1870.

IMPROVEMENT IN CANT-HOOKS.

The Schedule referred to in these Letters Patent and making part of the same.

*To all whom it may concern:*

Be it known that I, W. Q. GREELY, of St. Anthony, in the county of Hennepin, and in the State of Minnesota, have invented certain new and useful Improvements in Cant-Hooks; and do hereby declare that the following is a full, clear, and exact description thereof, reference being had to the accompanying drawings, and to the letters of reference marked thereon, making a part of this specification.

The nature of my invention consists in the construction and arrangement of a cant-hook, as will be hereinafter fully set forth, having reference to the annexed drawings, which represent a side view of my invention.

A represents a socket, of any suitable dimensions, made of iron, or other material answering the same purpose.

In this socket is inserted the handle or lever B, one side of the socket extending for a certain distance along the handle, and a metal ring, C, placed around the same, which strengthens it.

At the end of the socket A is secured or inserted the pick D, which may be square, as seen in the drawing, or round, whichever may be deemed most advantageous.

On one side of the socket A are two ears, $a\ a$, between which the dog or hook E is pivoted, and at a suitable distance in rear of said ears is secured a spring, $b$, which extends forward between the ears $a$ $a$, and presses against the under side of the pivoted end of the hook E.

The spring $b$, pressing on the hook E, holds the same in position, either when thrown forward or back.

The pick is first plunged into the timber. The spring keeps the point of hook forward, so that it is ready, at the raising of the lever, to catch at all times.

In detaching the dog, the lever is lowered, the pick remains firmly inserted, until the dog is forced to let go its hold, and the point is then loosened, and it also lets go, ready for another plunge, so that a man using this is never thrown by the dog or hook sticking to the timber, as is the case with nearly, if not all other dogs or hooks now in use.

The end of the hook, which is attached to the lever, is so shaped that when thrown back upon the lever, it is firmly stayed in that position by the spring, so that the lever can be used for prying timber, without the interference of the hook, thereby avoiding the disagreeable dangling of the hook.

The bolt or screw that holds the spring $b$ has a head, $c$, so shaped that it keeps the hook from resting on the spring, and thereby protects it from injury while laying back on the lever.

The stop $d$, on the end of the socket or holder A, prevents the hook from striking the pick.

The stop $d$, instead of being placed in front of the ears $a\ a$, as shown in the drawing, may be placed between them at the front side. This could readily be done by leaving a space solid between the front part of the ears.

Having thus fully described my invention,

What I claim as new, and desire to secure by Letters Patent, is—

1. The elongated socket or ferrule A, provided with ears $a\ a$, headed screw $c$, and stop $d$, all substantially as and for the purposes herein set forth.

2. In combination with the socket or ferrule A, constructed as described, the hook E, spring $b$, and pick D, all substantially as and for the purposes herein set forth.

In testimony that I claim the foregoing, I have hereunto set my hand and seal, this 17th day of April, 1869.

W. Q. GREELY. [L. S.]

Witnesses:
LEOPOLD EVERT,
WM. V. BRYANT.